United States Patent [19]
Johnson

[11] Patent Number: 4,868,504
[45] Date of Patent: Sep. 19, 1989

[54] APPARATUS AND METHOD FOR LOCATING METAL OBJECTS AND MINERALS IN THE GROUND WITH RETURN OF ENERGY FROM TRANSMITTER COIL TO POWER SUPPLY

[75] Inventor: David E. Johnson, Los Banos, Calif.

[73] Assignee: FLR, Inc., Los Banos, Calif.

[21] Appl. No.: 13,256

[22] Filed: Feb. 9, 1987

[51] Int. Cl.⁴ .................... G01V 3/10; G01V 3/165
[52] U.S. Cl. .................................. 324/329; 307/138; 324/239; 324/334; 361/156
[58] Field of Search ............ 324/329, 330, 334, 336, 324/233, 239; 307/104, 137, 138; 361/155, 156, 146

[56] References Cited

U.S. PATENT DOCUMENTS

| | | | |
|---|---|---|---|
| 3,020,471 | 2/1962 | Barringer | 324/330 X |
| 3,315,155 | 4/1967 | Colani | 324/336 X |
| 3,317,744 | 5/1967 | Geleynse | 324/336 X |
| 3,958,160 | 5/1976 | de Niet et al. | 361/156 |
| 4,157,579 | 6/1979 | Paul | 324/330 X |
| 4,170,037 | 10/1979 | Kimmel | 363/57 |
| 4,209,711 | 6/1980 | Baker | 307/104 |
| 4,276,484 | 6/1981 | Riveros | 324/334 X |
| 4,410,926 | 10/1983 | Hafner et al. | 361/156 X |
| 4,454,558 | 6/1984 | Huddart | 361/156 X |
| 4,535,292 | 8/1985 | Ensing | 324/330 |

FOREIGN PATENT DOCUMENTS

2071327 9/1981 United Kingdom ................ 324/329

OTHER PUBLICATIONS

Corbyn, J. A., Pulse Induction Metal Detector, *Wireless World* (Mar. 1980), vol. 86, No. 1531, pp. 40-44.
"Power MOSFET Application and Product Data", Hexfet Databook 1985 Third Edition, published by International Rectifier, pp. A-1, A-66, A-67.

*Primary Examiner*—Gerard R. Strecker
*Attorney, Agent, or Firm*—Flehr, Hohbach, Test, Albritton & Herbert

[57] ABSTRACT

Eddy current type metal detector for locating and distinguishing between different classes of metal objects, and geophysical apparatus for measuring various properties of soil and rock. A nonsinusoidal transmit voltage energizes a transmit coil which transmits a nonsinusoidal alternating magnetic field into the soil, rocks or metal objects to be located. Distortion of the magnetic field caused by the presence of these materials in the field induces corresponding voltage waveforms in a receive coil. The induced waveform is analyzed in order to deduce certain electrical properties of the materials, or in order to distinguish buried metal objects from the soil in which they are buried. The circuit which energizes the transmit coil returns energy from the collapse of the magnetic field to the power supply, minimizing the power consumption of the apparatus.

43 Claims, 3 Drawing Sheets

APPARATUS AND METHOD FOR LOCATING METAL OBJECTS AND MINERALS IN THE GROUND WITH RETURN OF ENERGY FROM TRANSMITTER COIL TO POWER SUPPLY

This invention pertains generally to metal detectors and geophysical exploration apparatus, and more particularly to apparatus which classifies the metal objects or rocks according to their electrical and magnetic properties.

Most present-day metal detectors fall into one of two classes: very low frequency (VLF) induction balance detectors and pulse induction detectors.

In a typical VLF induction balance metal detector, a transmit coil is driven by a sinusoidal voltage at a frequency within the VLF frequency band (3 to 30 kHz), although frequencies outside these limits are occasionally used. A receive coil is located near the transmit coil and in induction balance with respect to the transmit coil, so that the signal produced by the receive coil is minimized in the absence of a metal object within the response zone of the transmit-receive coil assembly. That assembly is commonly called the "searchcoil". The signal is amplified and synchronously demodulated at a phase which is preferably in quadrature with respect to signals induced by minerals in the soil, particularly magnetite and ferric oxide. The demodulated signal is then processed and applied to a speaker which gives an audible tone when the searchcoil passes over a metal object. Response to soil minerals is minimized by maintaining the synchronous demodulator in quadrature with respect to soil signals, and/or by so-called "motion circuits" which suppress low frequency response, soil signals typically having maximum energy below 2 or 3 Hz, whereas signals from metal objects usually have maximum energy between 2 and 10 Hz.

Pulse induction metal detectors typically include an oscillator which applies brief pulses at a rate of 100 to 3,000 pulses per second to a searchcoil having a single winding. The receiver circuit, which shares the single searchcoil winding with the transmitter, is gated off during the transmit pulse. Eddy currents induced in metal objects during the transmit pulse continue to flow in those objects for some time after the transmit pulse is terminated, and the receiver detects the voltage induced in the searchcoil by the decaying eddy currents. Pulse induction metal detectors ignore most soil minerals because response of most soil minerals to the transmit pulse is almost instantaneous and has decayed to negligible values by the time the receiver circuit is gated on.

In one type of geophysical apparatus, commonly called the "two-box" type, a transmitter coil and a receiver coil are mounted on opposite ends of a pole and mechanically or electrically nulled to produce a null signal in the receiver circuit. The frequency of operation is normally between 40 and 100 kHz. The received signal is amplitude demodulated to provide a tone or meter indication of departures from the null condition which occur if the apparatus is carried to a location where the soil or rock has electrical conductivity or magnetic susceptibility different from the location where the apparatus was nulled. This type of apparatus has been used for over 50 years in order to detect changes in soil or rock which might indicate the presence of a mineral deposit of economic value, and to detect deeply buried large metal objects such as treasure caches and water pipes.

In another type of geophysical apparatus, commonly called the VLF type, variations in the properties of the soil or rock are measured using transmit and receiver searchcoils which may be separable, or may be part of a fixed or mechanically adjustable induction balance assembly. The circuitry of this apparatus is similar to that used in VLF metal detectors. By demodulating the received signal at two different phases, the effects of soil/rock conductivity can be measured separately from those of magnetic susceptibility. Alternatively, the demodulation can be performed in phase quadrature with respect to the soil signal in order to locate buried metal objects while ignoring the soil.

Although these prior art instruments have proven very useful for their respective applications, they have certain limitations and disadvantages. VLF induction balance metal detectors, when used in soils containing large amounts of certain minerals, exhibit loss of sensitivity or "false signals" from the soil, and cannot reliably distinguish between different types or classes of metal objects. Pulse induction metal detectors, if they are to have good sensitivity and depth capability, exhibit very high power drain because energy of the collapsing field is dissipated as heat rather than being returned to the power supply. Their ability to distinguish between different classes of metal objects is also rather limited. The "two-box" type of geophysical apparatus does not produce quantitative measurements of an identifiable physical parameter of the soil or rock, and cannot be nulled with respect to variations in soil to make locating buried metal objects easier. The VLF geophysical exploration apparatus of the type previously described works well in most locations, but is subject to gross errors in conductivity readings in the presence of certain nonconductive minerals which exhibit magnetic hysteresis.

It is in general an object of the invention to provide a new and improved apparatus and method for metal detection and geophysical exploration.

Another object of the invention is to provide apparatus and a method of the above character which overcome the foregoing and other limitations and disadvantages of metal detectors and geophysical exploration apparatus heretofore provided.

Another object of the invention is to provide apparatus and a method of the above character in which power drain is minimized.

These and other objects are achieved in accordance with the invention by providing apparatus and a method in which a searchcoil is energized to produce a magnetic field which alternately builds up and collapses, with energy being returned to the power supply from the searchcoil upon collapse of the field. In one disclosed embodiment, the searchcoil has separate transmitting and receiving windings arranged to prevent direct induction of signals in the receiving winding by the transmitting winding, and the receiving winding is monitored continuously for signals induced by metal objects or minerals in the magnetic field. In another disclosed embodiment, the searchcoil is energized with temporally separated pulses, and the receiving winding is monitored only during the time intervals between successive ones of the energizing pulses.

Figure 1:
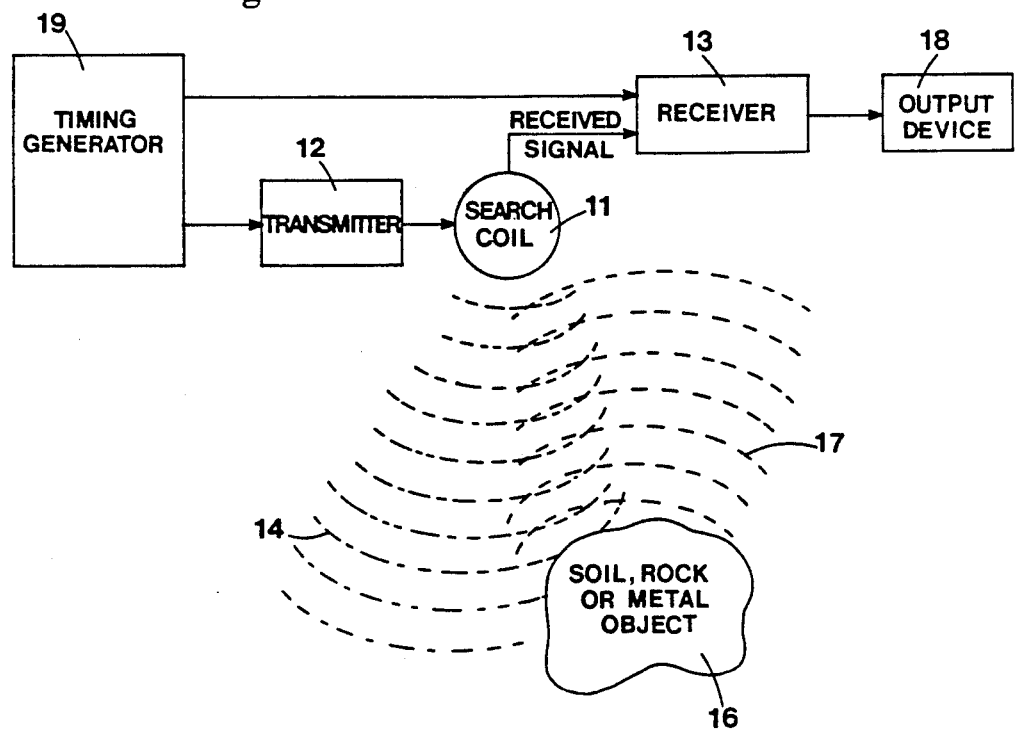
FIG. 1 is a generalized block diagram of apparatus for metal detection and geophysical exploration according to the invention.

The apparatus illustrated in FIG. 1 and the other figures of the drawing can be utilized either as a metal detector or as an instrument for geophysical exploration. For convenience, the term "metal detector" is used generically hereinafter to include geophysical exploration apparatus as well as other types of metal detectors.

The metal detector illustrated in FIG. 1 includes a searchcoil 11 to which a transmitter 12 and a receiver 13 are connected. The searchcoil is preferably of the induction balance type with separate transmitting and receiving windings arranged in such manner that signals are not induced directly in the receiving winding from the transmitting winding. The searchcoil is energized by the transmitter to produce a magnetic field 14 which alternately builds up and collapses, and soil, rocks and metal objects 16 in the field produce a field 17 which induces signals in the receiving winding. The receiver includes means for monitoring and analyzing these signals to determine the nature of the objects in the field. An output device 18 such as a meter or a loudspeaker indicates the presence and/or character of the objects in the field. Timing signals for the transmitter and the receiver are provided by a timing generator 19.

Figure 2:
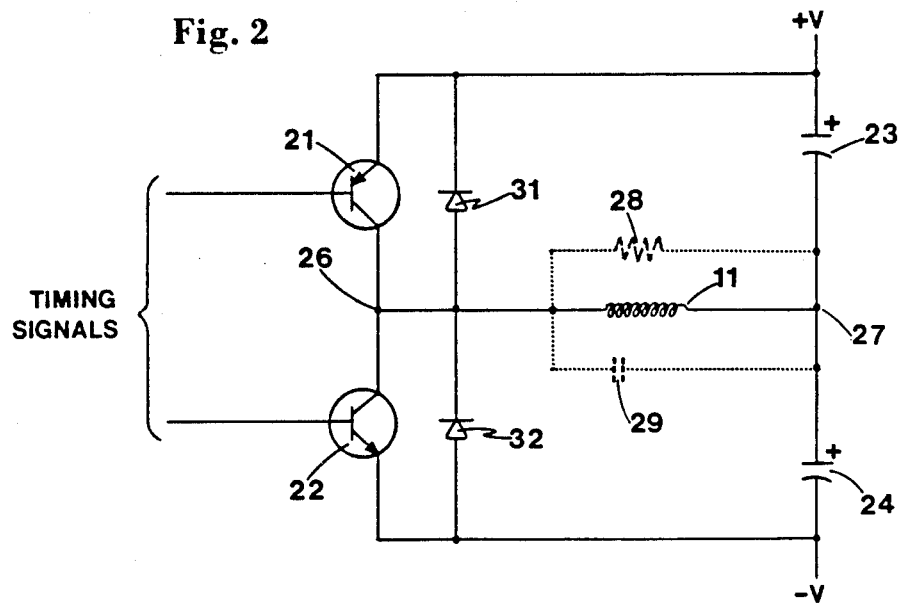
FIG. 2 is a circuit diagram of one embodiment of a transmitter for use in the apparatus of FIG. 1.

As illustrated in FIG. 2, the transmitter comprises a PNP transistor 21 and an NPN transistor 22 with their collectors connected to one end of the transmitting winding in searchcoil 11 and their emitters connected to the positive and negative terminals, respectively, of a DC power source such as a battery, The timing signals from generator 19 are applied to the bases of the transistors. Capacitors 23, 24 are connected between the second end of the searchcoil winding and the power source terminals, and the values of these capacitors are selected to provide a low impedance return path at the fundamental frequency at which the transmitter is driven. The junction 26 between the collectors of the transistors and the first end of the transmitting winding is sometimes referred to as the drive node, and the junction 27 between the capacitors and the other end of the coil is sometimes referred to as the return node. A shunt resistance 28 and a shunt capacitance 29 are shown in dotted lines as being connected across the transmitting coil. The shunt resistance can be added to minimize ringing when both transistors are turned off. The shunt capacitance includes the capacitances which are inherent in the circuit (e.g. collector capacitance, cable capacitance and the distributed capacitance of the transmitting winding) as well as capacitance which may be added in order to minimize the magnitude of spikes induced in a separate receiving coil via stray capacitance.

A pair of rectifying elements such as Schottky diodes 31, 32 are connected between driven node 26 and the power supply terminals. In the embodiment illustrated, the anode of diode 31 and the cathode of diode 32 are connected to the driven node, the cathode of diode 31 is connected to the positive supply terminal, and the anode of diode 32 is connected to the negative supply terminal. The diodes carry a flyback current from the searchcoil to the power supply upon collapse of the magnetic field produced by energization of the coil. These diodes can be omitted if the capacitance in parallel with the transmitting coil is great enough to maintain the voltage at the driven node between the power supply rails when transistors 21, 22 are both turned off and if the transistors are able to conduct current efficiently in a direction opposite to the normal direction of current flow through the transistors.

The timing signals from generator 19 control the conductivity of transistors 21, 22, and these signals are preferably interlocked so that both of the transistors cannot be turned on at the same time.

Assuming a positive current convention, when capacitors 23 and 24 are both charged and PNP transistor 21 is turned on, current flows from the positive terminal of capacitor 23 through transistor 21 and searchcoil winding 11, back to the negative terminal of capacitor 23. When transistor 21 is turned off, the voltage across the searchcoil winding reverses, and current flows through the loop consisting of the searchcoil winding, capacitor 24 and diode 32, transferring the energy stored in the searchcoil winding to capacitor 24. When NPN transistor 22 is turned on, current flows from the positive terminal of capacitor 24 through searchcoil winding 11 and transistor 22 to the negative terminal of capacitor 24. When transistor 22 turns off, the voltage across the searchcoil winding reverses, and current flows in the loop consisting of this winding, diode 31 and capacitor 23, transferring the stored energy from the inductor to capacitor 23. To the extent that energy is dissipated by the circuit, it is replaced by the source connected across capacitors 23, 24. The lower waveform in FIG. 4 shows the current produced in the searchcoil winding by this circuit when the transistors are alternately turned on and off by a square wave driving signal.

Figure 3:
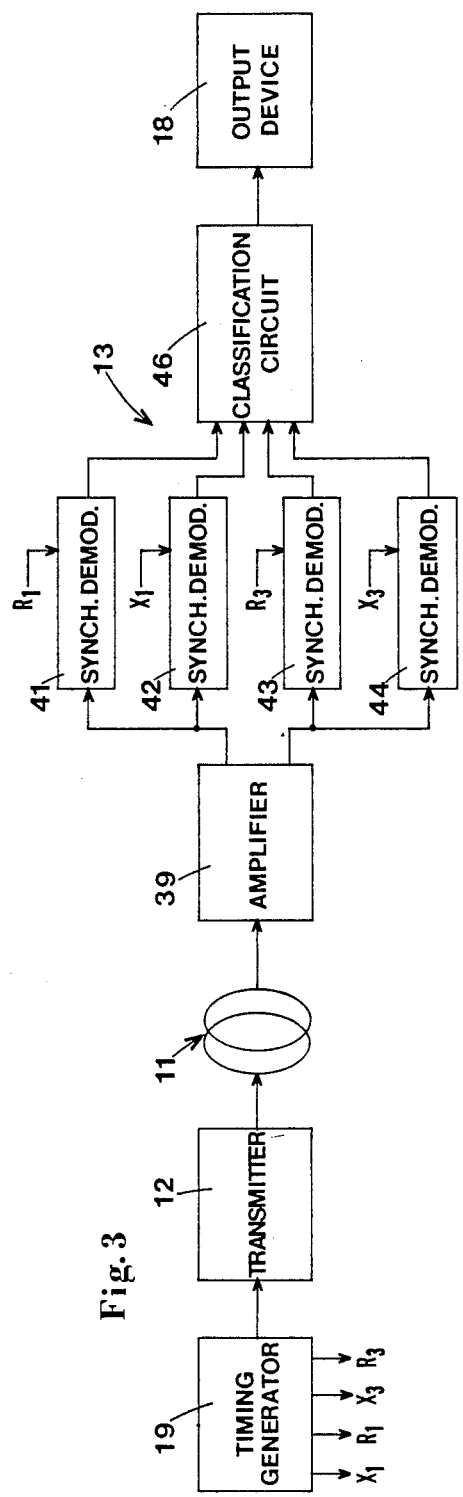
FIG. 3 is a block diagram of one embodiment of a metal detector according to the invention.

The metal detector illustrated in FIG. 3 utilizes the transmitter of FIG. 2 in an induction balance system. The excitation signal applied to the bases of transistors 21, 22 is a square wave signal which alternates between positive and negative levels, turning on the transistors to connect driven node 26 alternately to the positive and negative supply terminals or rails. The voltage thus applied to the driven node is a square wave voltage, as illustrated by the upper waveform 36 in FIG. 4. When the driving voltage is positive, NPN transistor 22 is turned on, and node 26 is driven negative. When the timing signal is negative, transistor 21 is turned on, and node 26 is driven positive. The excitation voltages thus applied to node 26 differ from the supply voltages by the relatively small voltage drops across the junctions in the transistors.

Figure 4:
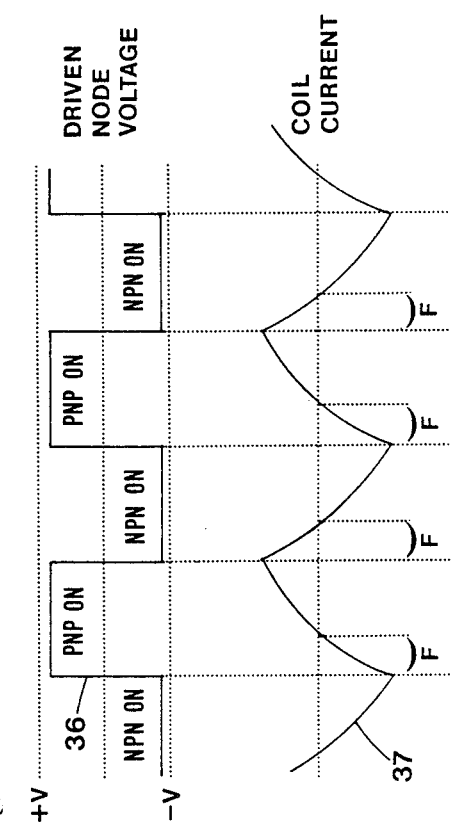
FIG. 4 is a waveform diagram illustrating the operation of the embodiment of FIG. 3.

The current produced in the transmitting winding of the searchcoil by the excitation voltage applied to the driven node is illustrated by the lower waveform 37 in FIG. 4. This current increases and decreases exponentially in a direction corresponding to the polarity of the applied voltage, producing a magnetic field which alternately builds up and collapses. Since the load presented by the coil is inductive, the phase of the current lags the phase of the applied voltage, and the current flow during a substantial portion of the ON time of each transistor is actually reversed. During the portion of time that the direction of current is reversed with respect to the applied voltage, the field of the coil delivers energy back to the power supply, thereby reducing the drain on the power supply. The intervals during which the current is reversed and energy is returned to the power supply are designated by the letter "F" in FIG. 4.

The amount of energy returned to the power supply differs from that delivered to the field by an amount corresponding to resistive losses in the circuit. With proper attention to detail, the efficiency of the circuit will be limited essentially by the Q factor of the transmitting coil, and the drain on the power supply will be comparable to that of a conventional sinusoidally driven resonant LC circuit. With a Q factor of 5, for example, the flyback time would typically be on the order of 35–40% of the time the transistor is turned on, and approximately 70–80% of the power will be returned to the supply.

Although the switching elements are illustrated in FIG. 2 as bipolar transistors, they can be MOSFETs or other suitable electronic switching devices.

In the embodiment of FIG. 3, the signals induced in the receiving winding of searchcoil 11 are monitored continuously. The received signals are amplified by an amplifier 39 which preferably includes bandpass filtering for separating the received signals into fundamental and third harmonic frequency components. The fundamental frequency component is applied to synchronous demodulators 41, 42, and the third harmonic component is applied to synchronous demodulators 43, 44. Phase reference signals $R_1$, $X_1$, $R_3$ and $X_3$ are applied to the demodulators by timing generator 19. These phases preferably correspond to the resistive component of the fundamental frequency, the reactive component of the fundamental frequency, the resistive component of the third harmonic frequency, and the reactive component of the third harmonic frequency, respectively.

The output signals from demodulators 41–44 are combined in classification circuit 46 to actuate output device 18 in the desired manner. For example, the demodulated signals can be summed and/or subtracted and/or divided in order to null out offending signals and/or distinguish between various classes of metal objects. In one presently preferred embodiment, one third of the third harmonic resistive signal is subtracted from the fundamental resistive signal in order to produce a composite resistive signal that ignores saltwater and soil conductivity. In this same embodiment, the fundamental reactive signal is subtracted from the third harmonic reactive signal to produce a composite reactive signal that ignores magnetite in the soil. The composite resistive signal is then divided by the composite reactive signal, with the quotient corresponding to the character of the metal target. Since both of the resistive signals are free of magnetite effects and both of the reactive signals are free of soil conductivity effect, the output signal is free of the effects of both magnetite and conductive salts in the soil. If desired, means such as differentiators can be included in the classification circuit to eliminate interference such as that which might be produced in the composite resistive signal by minerals which exhibit magnetic hysteresis.

In one presently preferred embodiment, output device 18 comprises an audio speaker which produces a tone having a pitch which corresponds to the character of the metal object and a magnitude which corresponds to the strength of the received signal so that the tone is heard only when the searchcoil is positioned over the metal object.

Many variations of the embodiment of FIG. 3 are possible. For example, the excitation signal applied to the transmitting coil can have a rectangular waveform with a duty cycle of one-third, rather than the 50% duty cycle illustrated in FIG. 4. This produces a signal which is rich in second harmonic content but contains no third harmonic component. Additional demodulators can be added for higher order harmonics. In a simplified version of the circuit, the first and third harmonic signals are shifted in phase and combined in the receiving amplifier so that a single demodulator will simultaneously demodulate both of the resistive components in a ratio which will null out saltwater and soil conductivity, producing a single demodulated signal which will respond to metal objects and be free of the effects of magnetite and dissolved salts in the soil.

When provided with appropriate classifying circuitry, the embodiment of FIG. 3 can serve as a geophysical instrument which provides independent readouts of magnetic susceptibility, magnetic hysteresis, and electrical conductivity.

Figure 5:
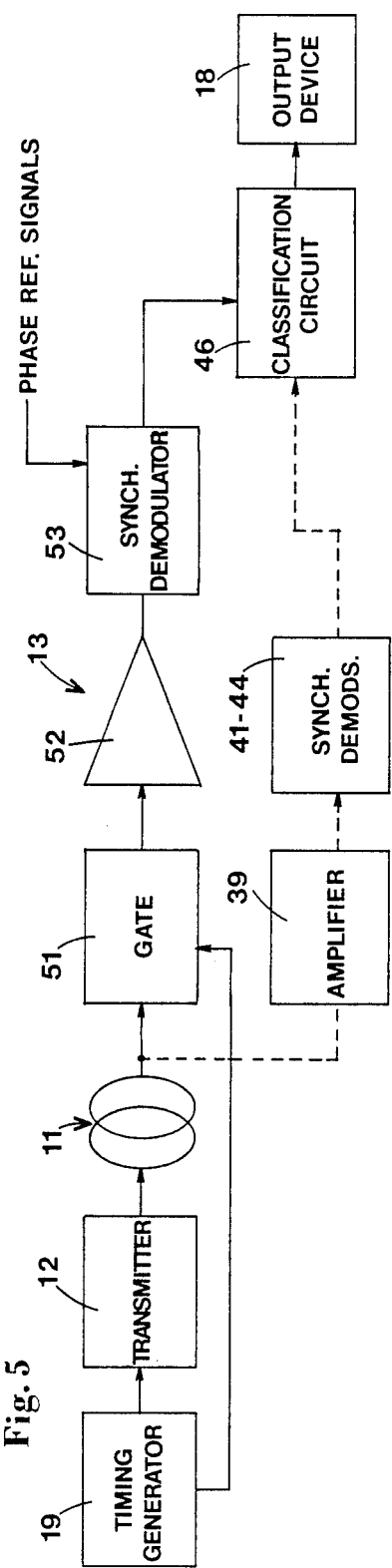
FIG. 5 is a block diagram of another embodiment of a metal detector according to the invention.

In the embodiment of FIG. 5, transmitter 12 is employed in a pulse induction metal detector. This embodiment has a significant advantage over conventional pulse induction metal detectors in that it does not have the excessive power drain which is common with such detectors.

Figure 6:
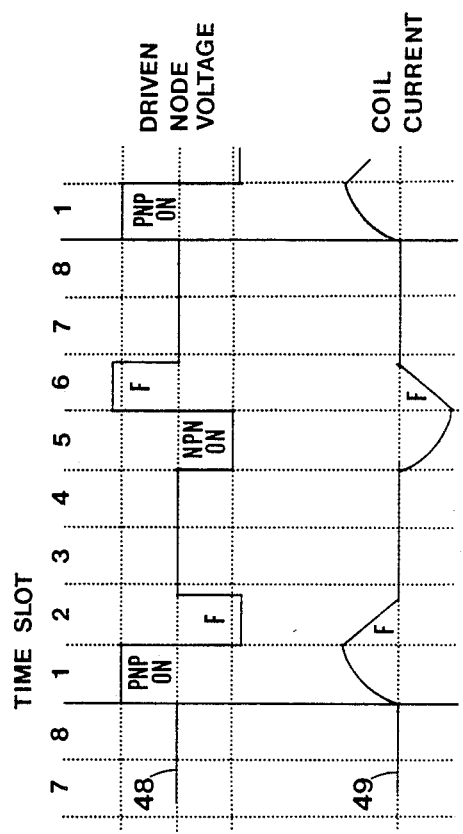
FIG. 6 is a waveform diagram illustrating the operation of the embodiment of FIG. 5.

In this embodiment, timing generator 19 includes an oscillator or clock which produces a square wave signal or other suitable waveform having a frequency of approximately 8 kHz, and a divide-by-8 counter-decoder which is driven by the oscillator to provide an excitation signal having 8 time slots per cycle, with each of the time slots corresponding to the one clock pulse from the oscillator. The excitation signal is positive during time slot 1 and negative during time slot 5, and the voltage at driven node 26 has the waveform 48 illustrated in FIG. 6. The current produced in the transmitting coil by this excitation voltage has the lower waveform 49 in FIG. 6. During time slot 1, the PNP transistor is turned on, pulling driven node 26 up to the positive supply rail. At the end of time slot 1, the PNP transistor is turned off, and the current created by the collapse of the field drives the driven node sufficiently negative to discharge the current through diode 32. Since the voltage drop across the coil during flyback F is greater than the voltage drop across the coil during time slot 1, and since there are losses in the circuit due to the resistance of the coil and other components, discharge will be complete prior to the end of time slot 2. Some resistance can be provided in parallel with the coil, as illustrated by resistance 28 in FIG. 2, in order to suppress ringing and return the voltage drop across the coil to zero as quickly as possible once discharge is complete. During the portion of time slot 2 that the discharge current is flowing through diode 32 to the negative supply rail, the return end of the coil is driving return node 27 positive, furnishing power to the positive supply rail through capacitor 23.

During time slot 5, the NPN transistor is turned on, pulling the driven node to the negative supply rail. The current that builds up in the coil during this time slot is then discharged through diode 31 to the positive supply rail during time slot 6 when the NPN transistor is turned off. Power is delivered from the coil to the positive rail or supply terminal during discharge, via diode 31.

As in the previous embodiments, searchcoil 11 is preferably an induction balance loop assembly, although a single coil can be used for both transmitting and receiving in this embodiment. The induction balance loop simplifies the design of the receiving circuits and provides improved target location or pinpointing as compared with a single coil.

The received signals are applied to a gating circuit 51 which receives control signals from timing generator 19. Gating circuit 51 is turned on during time slots 3, 4, 7 and 8, coupling the receiving coil to amplifier 52. This serves to eliminate pure reactive and pure resistive components produced by magnetite and dissolved salt in the soil since these components are present only during time slots 1, 2, 5 and 6. The eddy currents which continue flowing in a metal object after the field has collapsed cause signals to be induced during time slots 3, 4, 7 and 8.

The signals passed by gating circuit 51 are amplified by an amplifier 52 and applied to a synchronous demodulator 53 which receives phase reference signals from timing generator 19. Demodulator 53 converts the alternating signals to a DC signal which is applied to the input of a classification circuit 46, and the output of this circuit is applied to an output device 18. In one presently preferred embodiment, output device 18 comprises a loudspeaker, and the DC signal from demodulator 53 is processed to activate the speaker to provide an audio tone when the searchcoil passes over a metal object.

The embodiment of FIG. 5 can be modified in many ways and still be within the scope of the invention. For example, a different number of time slots can be employed, and the timing of gate 51 or demodulator 53 can be advanced or retarded to optimize the response of the system for a certain class of metal targets or to minimize the response for another class of targets. Additional demodulators can be employed, and the signals from these demodulators can be compared in order to determine the character of the metal object. Phase reference signals for the demodulators can be derived from the voltage on the driven node of the transmitting coil. Since the embodiment of FIG. 5 is generally sensitive to magnetic hysteresis in the soil but not to magnetic susceptibility or electrical conductivity, it is particularly suitable for geophysical use in measuring the magnetic hysteresis of rocks and soil. In a simplified version of the embodiment, demodulator 53 can be eliminated, and the alternating signal from gating circuit 51 or amplifier 52 can be utilized to drive an audio transducer to provide an audible indication of the presence of a metal object.

In the embodiment of FIG. 5, the signals induced in the searchcoil are monitored only during the time intervals between the transmitter energization pulses. If an induction balance searchcoil is employed, the receiving coil can also be monitored continuously as in the embodiment of FIG. 3. In this regard, an amplifier 39 and synchronous demodulators 41–44 similar to the corresponding elements in the embodiment of FIG. 3 can be connected between the receiving coil and classification circuit 46, as indicated in dashed lines in FIG. 5. This system has the advantages of both an induction balance metal detector and a pulse induction metal detector with minimal drain on the power supply.

It is apparent from the foregoing that a new and improved apparatus and method for metal detection and geophysical exploration have been provided. While only certain presently preferred embodiments have been described in detail, as will be apparent to those familiar with the art, certain changes and modifications can be made without departing from the scope of the invention as defined by the following claims.

I claim:

1. In apparatus for locating a metal object or mineral in the ground: a searchcoil adapted to be moved over the surface of the earth, a transmitter connected to the searchcoil for energizing the coil with a voltage of generally rectangular waveform to produce a magnetic field which alternately builds up and collapses, a receiver connected to the searchcoil responsive to signals induced in the searchcoil by metal objects or minerals in the magnetic field, a power supply with an energy storage element for supplying operating power to the transmitter, and means interconnecting the power supply and the searchcoil for returning energy from the searchcoil to the energy storage element during collapse of the magnetic field.

2. The apparatus of claim 1 wherein the transmitter includes means for alternately applying energization voltages of opposite polarity to the searchcoil to alternately change the polarity of the magnetic field.

3. The apparatus of claim 2 wherein the searchcoil has transmitting and receiving windings arranged in such manner that signals are not induced directly in the receiving winding by energization of the transmitting winding, and the receiver continuously monitors the receiving winding for signals induced therein.

4. The apparatus of claim 2 wherein the energizing voltages of opposite polarity applied to the searchcoil are temporally separated, and the receiver is adapted to monitor the signals induced in the searchcoil only during time intervals between successive ones of the applied voltages.

5. The apparatus of claim 4 wherein the searchcoil has separate transmitting and receiving windings arranged in such manner that signals are not induced directly in the receiving winding by energization of the transmitting winding.

6. The apparatus of claim 5 wherein the receiver includes means for continuously monitoring the receiving winding.

7. The apparatus of claim 1 wherein the means interconnecting the power supply and the searchcoil includes a first switching element connected between a first end of the searchcoil and the positive terminal of the power supply, and a second switching element connected between the first end of the searchcoil and the negative terminal of the power supply, the first named energy storage element and a second energy storage element providing a low impedance return path between the second end of the searchcoil and respective ones of the power supply terminals.

8. The apparatus of claim 7 including rectifier elements connected between the first end of the searchcoil and the power supply terminals for conducting current from the searchcoil to the energy storage elements during collapse of the magnetic field.

9. The apparatus of claim 7 including means for applying a timing signal having a generally rectangular waveform to the switching elements to actuate the switching elements to alternately connect the one end of the searchcoil to the positive and negative terminals of the power supply, the energy storage elements comprising capacitors having a low impedance at the fundamental frequency of the timing signal.

10. The apparatus of claim 9 wherein the timing signal alternates between positive and negative voltage levels.

11. The apparatus of claim 9 wherein the timing signal comprises a signal of positive and negative pulses of predetermined duration separated by time intervals greater than the duration of the pulses.

12. The apparatus of claim 1 wherein the transmitter includes a PNP transistor having its emitter connected to the positive terminal of the power supply and its collector connected to a first end of the searchcoil, an NPN transistor having its emitter connected to the negative terminal of the power supply and its collector connected to the first end of the searchcoil, and means for applying a timing signal having a generally rectangular waveform to the bases of the transistors for alternately turning the transistors on, the energy storage element comprising a capacitor having a low impedance at the fundamental frequency of the generally rectangular waveform connected between the second end of the searchcoil and the power supply.

13. The apparatus of claim 12 further including a first diode having its anode connected to the first end of the searchcoil and its cathode connected to the positive terminal of the power supply, and a second diode having its cathode connected to the first end of the searchcoil and its anode connected to the negative terminal of the power supply.

14. The apparatus of claim 12 wherein the timing signal alternates between positive and negative voltage levels, and the receiver continuously monitors the searchcoil for signals induced therein.

15. The apparatus of claim 12 wherein the timing signal comprises a series of alternating positive and negative pulses of predetermined duration separated by time intervals greater than the duration of the pulses, and the receiver monitors the searchcoil for signals induced therein only during the intervals between the pulses.

16. In apparatus for locating a metal object or mineral in the ground: a searchcoil adapted to be moved over the surface of the earth, a power supply having positive and negative terminals, a transmitter having controlled switching elements connected between a first end of the searchcoil and the power supply terminals, energy storage elements connected between the second end of the searchcoil and the power supply terminals, means for applying a timing signal of generally rectangular waveform to the control inputs of the switching elements to condition the switching elements to alternately connect the first end of the searchcoil to the positive and negative power supply terminals and thereby apply a voltage of generally rectangular waveform to the searchcoil to produce a magnetic field which alternately builds up and collapses, means for delivering energy from the searchcoil to the energy storage elements upon collapse of the magnetic field, and a receiver for monitoring the searchcoil for signals induced therein by metal objects or minerals in the magnetic field.

17. The apparatus of claim 16 wherein the means for delivering energy from the searchcoil to the storage elements comprises a first diode having its anode connected to the first end of the searchcoil and its cathode connected to the positive terminal of the power supply, and a second diode having its cathode connected to the first end of the searchcoil and its anode connected to the negative terminal of the power supply.

18. The apparatus of claim 16 wherein the energy storage elements comprise capacitors having a low impedance at the fundamental frequency of the generally rectangular timing signal.

19. The apparatus of claim 16 wherein the timing signal alternates directly between levels for turning on the respective switching elements, and the receiver monitors the searchcoil continuously for signals induced therein.

20. The apparatus of claim 16 wherein the timing signal comprises a series of temporally separated pulses, and the receiver monitors the searchcoil only during the intervals between the pulses.

21. The apparatus of claim 16 wherein the switching elements comprise a PNP transistor having its emitter connected to the positive terminal of the power supply and its collector connected to the first end of the searchcoil and an NPN transistor having its emitter connected to the negative terminal of the power supply and its collector connected to the first end of the searchcoil, the timing signal being applied to the bases of the transistors.

22. The apparatus of claim 16 wherein the searchcoil has separate transmitting and receiving windings positioned in inductive balance so that signals are not induced directly in the receiving winding from the transmitting winding.

23. In apparatus for locating a metal object or mineral in the ground: a searchcoil having separate transmitting and receiving windings arranged in such manner that signals are not induced directly in the receiving winding from the transmitting winding, a power supply having positive and negative terminals, a transmitter having switching elements connected between a first end of the transmitting winding and the power supply terminals, energy storage elements connected between the second end of the transmitting winding and the power supply terminals, means for applying a generally rectangular timing signal which alternates between first and second levels to the switching elements to alternately actuate the switching elements to connect the first end of the transmitting winding to the positive and negative terminals of the power supply and thereby apply a voltage of generally rectangular waveform to the searchcoil to produce a magnetic field which alternately builds up and collapses, means for delivering energy from the transmitting winding to the energy storage elements upon collapse of the magnetic field, and a receiver connected to the receiving winding for continuously monitoring said winding for signals induced therein by metal objects or minerals in the magnetic field.

24. The apparatus of claim 23 including a first diode having its anode connected to the first end of the transmitting winding and its cathode connected to the positive terminal of the power supply, and a second diode having its cathode connected to the first end of the transmitting winding and its anode connected to the negative terminal of the power supply.

25. The apparatus of claim 23 wherein the energy storage elements comprise capacitors having a low impedance at the fundamental frequency of the generally rectangular timing signal.

26. The apparatus of claim 23 wherein the switching elements comprise a PNP transistor having its emitter connected to the positive terminal of the power supply and its collector connected to the first end of the transmitting winding and an NPN transistor having its emitter connected to the negative terminal of the power supply and its collector connected to the first end of the transmitting winding, the timing signals being applied to the bases of the transistors.

27. In apparatus for locating a metal object or mineral in the ground: a searchcoil having separate transmitting and receiving windings arranged in such manner that signals are not induced directly in the receiving winding by the transmitting winding, a power supply having positive and negative terminals, a transmitter having switching elements connected between the second end of the transmitting winding and the power supply terminals, means for applying a timing signal comprising a series of temporally separated pulses of alternate level to the switching elements to alternately actuate the switching elements to connect the first end of the transmitting winding to the positive and negative terminals of the power supply to produce a magnetic field which alternately builds up and collapses, means for delivery energy from the transmitting winding to the energy storage elements during the time intervals between successive ones of the temporally separated pulses, and a receiver connected to the receiving winding with means for monitoring the receiving winding for signals induced therein only during the time intervals between the temporally separated pulses.

28. The apparatus of claim 27 including a first diode having its anode connected to the first end of the transmitting winding and its cathode connected to the positive terminal of the power supply, and a second diode having its cathode connected to the first end of the transmitting winding and its anode connected to the negative terminal of the power supply.

29. The apparatus of claim 27 wherein the energy storage elements comprise capacitors having a low impedance at the fundamental frequency of the generally rectangular timing signal.

30. The apparatus of claim 27 wherein the switching elements comprise a PNP transistor having its emitter connected to the positive terminal of the power supply and its collector connected to the first end of the transmitting winding and an NPN transistor having its emitter connected to the negative terminal of the power supply and its collector connected to the first end of the transmitting winding, the timing signals being applied to the bases of the transistors.

31. The apparatus of claim 27 wherein the receiver also includes means for monitoring the receiving winding continuously.

32. In a method for locating a metallic object or a mineral in the ground, the steps of: moving a searchcoil over the surface of the earth, energizing the searchcoil with a voltage of generally rectangular waveform to produce a magnetic field which alternately builds up and collapses, monitoring the searchcoil for signals induced therein by metallic objects or minerals in the magnetic field, supplying operating power to the searchcoil from a power supply having an energy storage element, and returning energy from the searchcoil to the energy storage element during collapse of the magnetic field.

33. The method of claim 32 wherein energizing voltages of opposite polarity are applied alternately to the searchcoil.

34. The method of claim 33 wherein the searchcoil has transmitting and receiving windings arranged in such manner that signals are not induced directly in the receiving winding by the transmitting winding, and the receiving winding is monitored continuously for signals induced therein.

35. The method of claim 33 wherein the energizing voltages of opposite polarity applied to the searchcoil are temporally separated, and the signals induced in the searchcoil are monitored only during time intervals between successive ones of the applied voltages.

36. In apparatus for locating metal and detecting minerals:
an inductive nonresonant transmitter coil;
a D.C. power supply having positive and negative output terminals and capacitive energy storage means connected between said output terminals;
said storage means having sufficient electrical capacitance to store the energy of flyback currents from the transmitter coil;
low impedance means coupling a first end of the transmitter coil to the output terminals of the power supply;
positive and negative switching means for coupling a second end of the transmitter coil to the positive and negative output terminals of the power supply, respectively;
timing means for actuating the positive and negative switching means alternately at predetermined times to cause a nonsinusoidal driving current of alternating polarity to flow in the transmitter coil and produce a nonsinusoidal alternating magnetic field in the vicinity of the transmitter coil;
positive and negative current steering means coupling the second end of the transmitter coil to the power supply output terminals for steering positive and negative flyback currents from the transmitter coil to the positive and negative power supply output terminals, respectively, said flyback currents occurring when the positive switching means for the negative switching means is turned off allowing the magnetic field to collapse;
receiver means responsive to variations in the magnetic field caused by the presence of metal or minerals within the magnetic field;
and indicator means responsive to the receiver means for indicating the presence of the metal or minerals within the magnetic field.

37. The apparatus of claim 36 wherein the positive and negative current steering means are rectifiers.

38. The apparatus of claim 36 wherein said receiver means includes a receiver coil located in proximity to, and in induction balance with respect to, the transmitter coil.

39. The apparatus of claim 36 wherein said receiver means is connected to the transmitting coil for receiving signals picked up by the coil during times when no driving current is flowing through the transmitting coil.

40. The apparatus of claim 36 wherein said timing means is adapted to actuate the positive and negative switching means alternately with equal on-time, producing a square wave voltage across the transmitter coil.

41. The apparatus of claim 36 wherein said timing means is adapted to actuate the positive and negative switching means alternately at predetermined times in a timing cycle, the period for which each of the switching means is turned on being short relative to the entire timing cycle, mutual off-time consisting of a major portion of the entire timing cycle.

42. The apparatus of claim 36 wherein the first end of the transmitter coil is coupled to the output terminals of the power supply through the capacitive energy storage means.

43. The apparatus of claim 36 wherein the positive and negative switching means and the positive and negative current steering means are combined in common circuit components.

* * * * *